(12) United States Patent
Gildfind et al.

(10) Patent No.: US 9,106,975 B1
(45) Date of Patent: Aug. 11, 2015

(54) DISTRIBUTION OF ADVERTISING-FREE CONTENT AND REPLACEMENT ADVERTISING TO DISTINCT DEVICES

(71) Applicant: GOOGLE INC., Mountain View, CA (US)

(72) Inventors: Andrew Gildfind, Brixton (GB); Ant Oztaskent, Sutton (GB); Yaroslav Volovich, Cambridge (GB); Simon Michael Rowe, Finchampstead (GB)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/727,551

(22) Filed: Dec. 26, 2012

Related U.S. Application Data

(60) Provisional application No. 61/612,903, filed on Mar. 19, 2012.

(51) Int. Cl.
*H04N 7/16* (2011.01)
*H04N 21/81* (2011.01)

(52) U.S. Cl.
CPC .................................. *H04N 21/812* (2013.01)

(58) Field of Classification Search
CPC ...................... H04M 1/72533; H04M 2250/64; H04N 21/23; H04N 21/4126; H04N 21/4753; H04N 7/165; H04N 21/4622; H04N 21/42209; H04N 2005/443; H04N 21/41407; H04N 21/42224; H04N 21/812; H04N 21/42204; H04N 21/42208; H04N 21/8133; H04L 67/20; H04H 20/28; H04H 20/57
USPC ....................................................... 725/34, 32
See application file for complete search history.

(56) References Cited

U.S. PATENT DOCUMENTS

| | | | |
|---|---|---|---|
| 6,546,555 B1 * | 4/2003 | Hjelsvold et al. ................. | 725/1 |
| 6,567,984 B1 * | 5/2003 | Allport ........................... | 725/81 |
| 7,725,399 B2 | 5/2010 | Nakahara et al. | |
| 8,413,183 B2 | 4/2013 | Kunkel et al. | |
| 2002/0162121 A1 * | 10/2002 | Mitchell ...................... | 725/135 |
| 2005/0110909 A1 | 5/2005 | Staunton et al. | |
| 2007/0136742 A1 | 6/2007 | Sparrell | |
| 2007/0154169 A1 * | 7/2007 | Cordray et al. ................. | 386/83 |
| 2007/0217612 A1 * | 9/2007 | So ................................ | 380/277 |
| 2010/0325413 A1 | 12/2010 | Chandramouli et al. | |
| 2011/0281566 A1 * | 11/2011 | Davis et al. ............... | 455/414.1 |

* cited by examiner

*Primary Examiner* — Benjamin R Bruckart
*Assistant Examiner* — Jen-Shi Huang
(74) *Attorney, Agent, or Firm* — Morgan, Lewis & Bockius LLP

(57) ABSTRACT

A method at a first device coupled to a display includes: when no second device is linked with the first device, receiving a first content stream, the first content stream including a content item and one or more first advertisements, and outputting the content item and the first advertisements to the display. The method also includes: when a second device is linked with the first device, receiving a second content stream, the second content stream including the content item and not including the first advertisements, and outputting the content item to the display without the first advertisements.

22 Claims, 10 Drawing Sheets

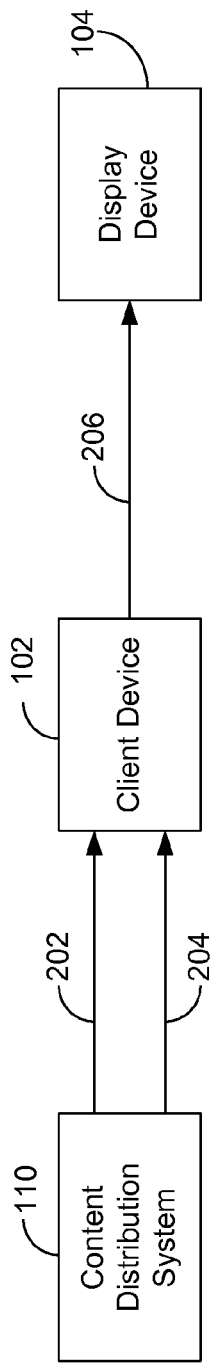
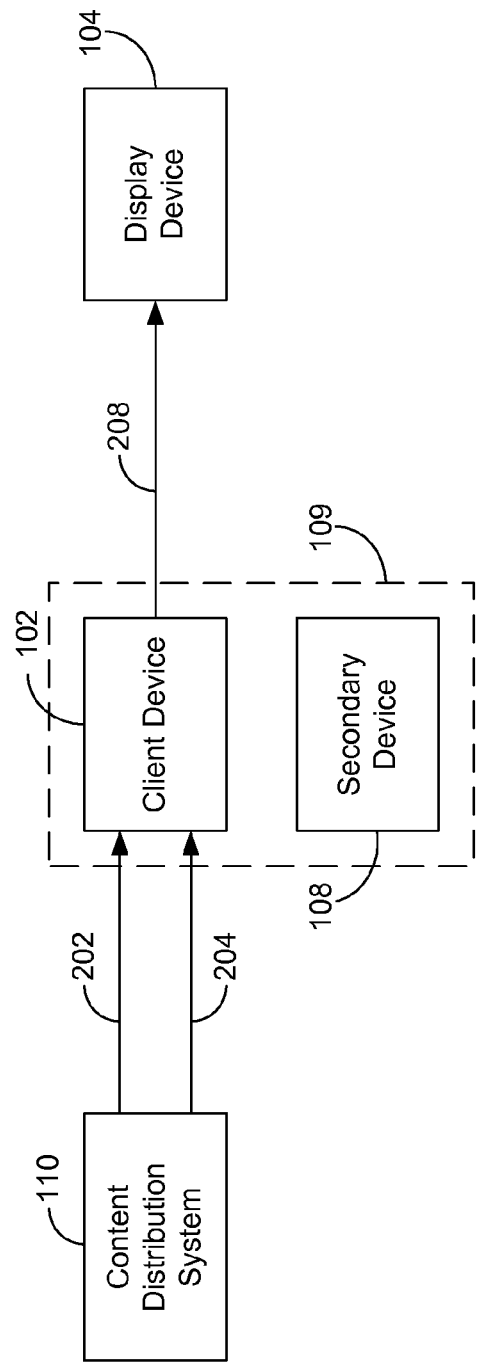
Figure 2A
Figure 2B

DISTRIBUTION OF ADVERTISING-FREE CONTENT AND REPLACEMENT ADVERTISING TO DISTINCT DEVICES

CROSS-REFERENCE TO RELATED APPLICATIONS

This application claims priority to the following U.S. Provisional Patent Application No. 61/612,903, entitled Distribution of Advertising-Free Content and Replacement Advertising to Distinct Devices, filed Mar. 19, 2012, which is incorporated by reference herein in its entirety.

BACKGROUND

The disclosed implementations relate generally to content distribution.

Advertising is a major source of revenue for content distributors, such as television networks. Typically, content (e.g., a television show) distributed by a television network includes interstitial advertisements. Viewers may be annoyed by the amount of advertisements shown on television and by the fact that the advertisements often interrupt the flow of television programming, and these viewers may be receptive to ways to avoid the advertisements (e.g., fast forwarding through the advertisements when watching programs recorded on digital video recorders, watching programs on disk or on an online streaming service, etc.). However, viewer avoidance of advertisements can lead to less revenue for television networks.

SUMMARY

Content may be delivered in a version with advertisements and a version without advertisements to a client device, for output to a display connected to the client device. The version with advertisements is output if the client device is not linked with a second screen device. The version without advertisements is output if the client device is linked with a second screen device. If the client device is linked with a second screen device, advertisements may be output through the second screen device while the version of the content without the advertisements is output through the client device.

According to some implementations, a method is performed at a first device coupled to a display. The method includes: when no second device is linked with the first device, receiving a first content stream, the first content stream including a content item and one or more first advertisements, and outputting the content item and the first advertisements to the display; and, when a second device is linked with the first device, receiving a second content stream, the second content stream including the content item and not including the first advertisements, and outputting the content item to the display without the first advertisements.

In some implementations, the first device is one of: a set-top box, and a device with set-top box capabilities.

In some implementations, the second device is one of: a desktop computer, a notebook computer, a netbook computer, a tablet device, a portable media player device, a portable video game player device, and a smartphone.

In some implementations, the first advertisements are interstitial with respect to the content item.

In some implementations, outputting the content item and the first advertisements comprises outputting the content item and the first advertisements as received in the first content stream.

In some implementations, the second device includes a display. Also, when the second device is linked with the first device, the first device signals the second device to display one or more second advertisements on the display of the second device.

In some implementations, second advertisements include one or more advertisements related to the content item.

In some implementations, the second advertisements are received from a server.

In some implementations, the second advertisements include one or more of the first advertisements.

In some implementations, the method also includes receiving a request from a second device to link with the first device, and in response to the request, linking the second device with the first device.

In some implementations, the request is sent from the second device to a server and received by the first device from the server.

In some implementations, when the second device is linked with the first device, a signal is sent to the second device to display one or more second advertisements, wherein the signal is sent from the server to the second device.

In some implementations, the request is sent from the second device to the first device.

In some implementations, the request is sent from the second device to the first device wirelessly.

In some implementations, when the second device is linked with the first device, the secondary device is enabled to be a remote control for the first device.

In some implementations, second content stream is access-restricted.

In some implementations, the access-restricted second content stream is an encrypted content stream.

According to some implementations, a system includes one or more processing units, a display device, and memory storing one or more programs to be executed by the one or more processing units. The one or more programs include instructions for: when no second device is linked with the system, receiving a first content stream, the first content stream including a content item and one or more first advertisements, and outputting the content item and the first advertisements to the display; and when a second device is linked with the system, receiving a second content stream, the second content stream including the content item and not including the first advertisements, and outputting the content item to the display without the first advertisements.

In some implementations, the system also instructions for performing any of the above described methods.

According to some implementations, a non-transitory computer readable storage medium stores one or more programs configured for execution by a computer coupled to a display. The one or more programs include instructions for: when no second device is linked with the computer system, receiving a first content stream, the first content stream including a content item and one or more first advertisements, and outputting the content item and the first advertisements to the display; and when a second device is linked with the computer system, receiving a second content stream, the second content stream including the content item and not including the first advertisements; and outputting the content item to the display without the first advertisements.

In some implementations, the non-transitory computer readable storage medium also instructions for performing any of the above described methods.

According to some implementations, a method is performed at a server communicatively coupled with a first device and a second device. The method includes receiving a request from the second device to link with the first device; in response to the request, linking the second device with the first device; and after the linking, signaling the second device to display one or more second advertisements. When a first device is not linked with a second device, the first device receives a first content stream comprising a content item and one or more first advertisements, and outputs the content item and one or more first advertisements. When the first device is linked with a second device, the first device receives a second content stream comprising the content item and not including the first advertisements, and outputs the content item.

In some implementations, the second advertisements include one or more advertisements related to the content item.

In some implementations, the second advertisements include one or more of the first advertisements.

In some implementations, linking the second device with the first device comprises enabling the second device to be a remote control for the first device.

According to some implementations, a system includes one or more processing units, and memory storing one or more programs to be executed by the one or more processing units. The one or more programs includes instructions for: receiving a request from a second device to link with a first device; in response to the request, linking the second device with the first device; and after the linking, signaling the second device to display one or more second advertisements. When the first device is not linked with a second device, the first device receives a first content stream comprising a content item and one or more first advertisements, and outputs the content item and one or more first advertisements. When the first device is linked with a second device, the first device receives a second content stream comprising the content item and not including the first advertisements, and outputs the content item.

In some implementations, the system also instructions for performing any of the above described methods.

According to some implementations, a non-transitory computer readable storage medium stores one or more programs configured for execution by a computer. The one or more programs include instructions for: receiving a request from a second device to link with a first device; in response to the request, linking the second device with the first device; and after the linking, signaling the second device to display one or more second advertisements. When the first device is not linked with a second device, the first device receives a first content stream comprising a content item and one or more first advertisements, and outputs the content item and one or more first advertisements. When the first device is linked with a second device, the first device receives a second content stream comprising the content item and not including the first advertisements, and outputs the content item.

In some implementations, the non-transitory computer readable storage medium also instructions for performing any of the above described methods.

According to some implementations, a method is performed at a server in communication with a first device. The method includes: determining whether a second device is linked with the first device; when no second device is determined to be linked with the first device, sending to the first device a first content stream, the first content stream comprising a content item and one or more advertisements; and when a second device is determined to be linked with the first device, sending to the first device a second content stream, the second content stream comprising the content item and not including the one or more advertisements.

In some implementations, sending the second content stream includes encrypting the second content stream, and sending to the first device the encrypted second content stream.

According to some implementations, a system includes one or more processing units, and memory storing one or more programs to be executed by the one or more processing units. The one or more programs include instructions for: determining whether a second device is linked with a first device; when no second device is determined to be linked with the first device, sending to the first device a first content stream, the first content stream comprising a content item and one or more advertisements; and when a second device is determined to be linked with the first device, sending to the first device a second content stream, the second content stream comprising the content item and not including the one or more advertisements.

In some implementations, the system also instructions for performing any of the above described methods.

According to some implementations, a non-transitory computer readable storage medium stores one or more programs configured for execution by a computer coupled to a display. The one or more programs include instructions for: determining whether a second device is linked with a first device; when no second device is determined to be linked with the first device, sending to the first device a first content stream, the first content stream comprising a content item and one or more advertisements; and when a second device is determined to be linked with the first device, sending to the first device a second content stream, the second content stream comprising the content item and not including the one or more advertisements.

In some implementations, the non-transitory computer readable storage medium also instructions for performing any of the above described methods.

According to some implementations, a method is performed at a computer system having one or more processors and memory storing one or more programs executed by the one or more processors. The method includes: outputting a first content stream including a content item and one or more first advertisements; outputting a second content stream including the content item and not including the first advertisements, wherein the second content stream is encrypted; and outputting a decryption key to a first device. The device is configured to decrypt the second content stream using the decryption key and output the content item to a display upon linking with a second device, the second device being configured to display one or more second advertisements received from the first device that are related.

In some implementations, the computer system outputs metadata associated with the content item, and one or more second advertisements associated with the content item, wherein the device determines which of the second advertisements are related based on the metadata.

According to some implementations, a system includes one or more processing units and memory storing one or more programs to be executed by the one or more processing units. The one or more programs include instructions for: outputting a first content stream including a content item and one or more first advertisements; outputting a second content stream including the content item and not including the first advertisements, wherein the second content stream is encrypted; and outputting a decryption key to a first device. The device is configured to decrypt the second content stream using the decryption key and output the content item to a display upon linking with a second device, the second device being configured to display one or more second advertisements received from the first device that are related.

In some implementations, the system also instructions for performing any of the above described methods.

According to some implementations, a non-transitory computer readable storage medium stores one or more programs configured for execution by a computer. The one or more programs include instructions for: outputting a first content stream including a content item and one or more first advertisements; outputting a second content stream including the content item and not including the first advertisements, wherein the second content stream is encrypted; and outputting a decryption key to a first device. The device is configured to decrypt the second content stream using the decryption key and output the content item to a display upon linking with a second device, the second device being configured to display one or more second advertisements received from the first device that are related.

In some implementations, the non-transitory computer readable storage medium also instructions for performing any of the above described methods.

BRIEF DESCRIPTION OF THE DRAWINGS

FIGS. 2A-2B are block diagrams illustrating distribution of content from a content distribution system to a client device, according to some implementations.

DETAILED DESCRIPTION

A content and advertisement distribution method and system is described. A content distributor may monetize content by inserting advertisements into the content. However, such inserted advertisements may be unpopular with consumers of the content. An alternative content monetization strategy includes providing advertisements for display on a secondary device while the content is output on a first device. Content is distributed from a content distribution system to a client device (e.g., a set-top box) in two streams—a first stream that includes advertisements, and a second stream with less or no advertisements. When the client device is not linked with an authorized secondary device, the client device outputs the contents of the first stream, including the advertisements. When the client device is linked with an authorized secondary device, the client device outputs the contents of the second stream rather than the first stream. Advertisements may be displayed on the authorized secondary device to compensate for the lack of advertisements in the second stream.

Figure 1:
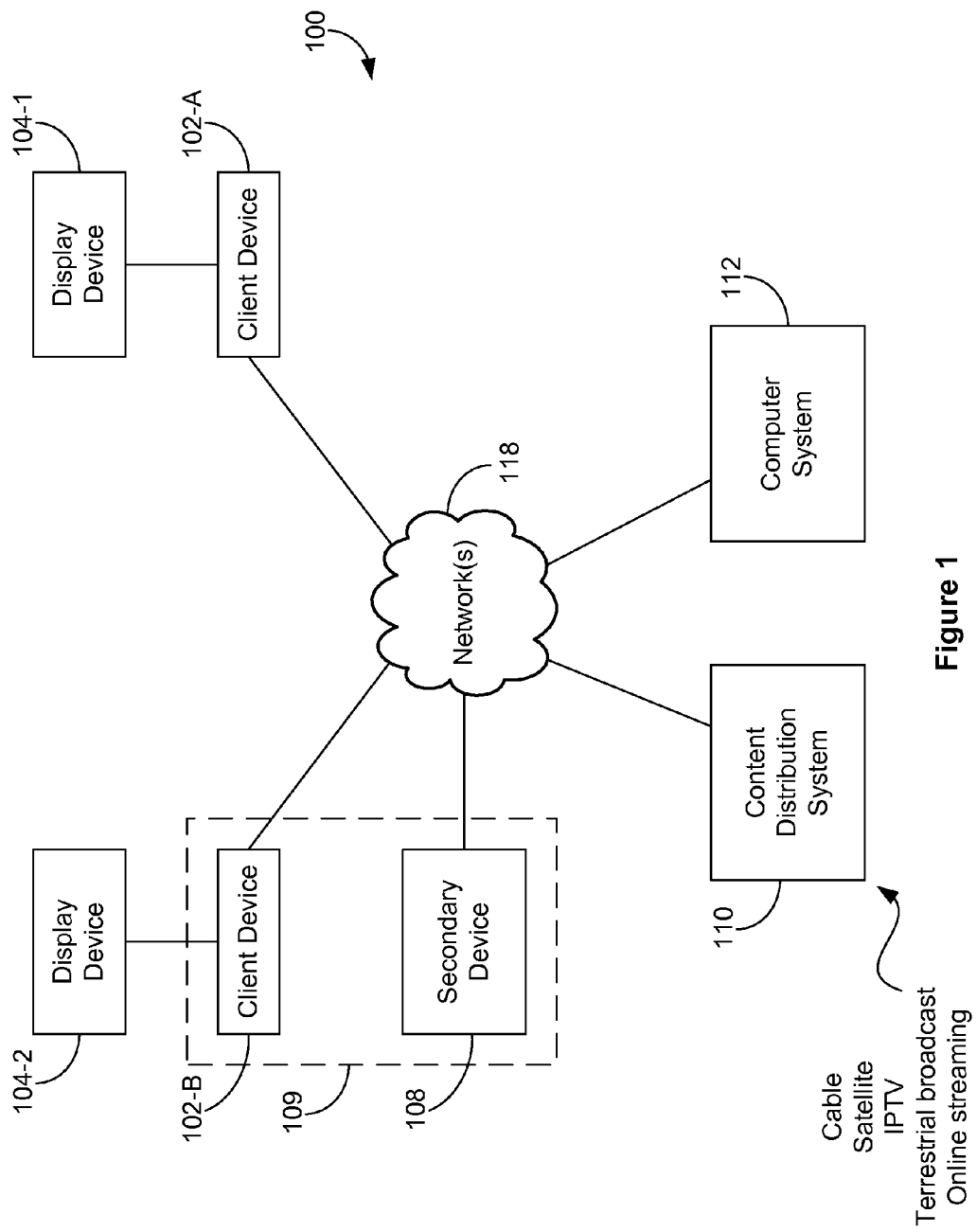
FIG. 1 is a block diagram illustrating a content distribution environment, according to some implementations.

FIG. 1 is a block diagram illustrating a content distribution environment according to some implementations. The content distribution environment 100 includes one or more client devices 102. A respective client device 102 is coupled to a respective display device 104. Client devices 102 are communicatively coupled to a content distribution system 110 and a computer system 112 by one or more communications networks 118 (e.g., the Internet). In some implementations, client devices 102 may be set-top boxes. As used in this specification, a set-top box (STB) is a device that is configured to receive one or more external signals and to output content that is carried in the signals. In some implementations, a STB is a conventional, dedicated set-top box; a hybrid device, such as a digital video recorder (DVR) with set-top box capabilities as described herein; a personal computer with set-top box capabilities, an internet-connected media streaming device with set-top box capabilities; or a game console with set-top box capabilities. The signals may be broadcast signals, signals carried over a cable television system or satellite television system, or data packets, for example.

A respective client device 102 receives signals containing one or more streams of content (e.g., television programming, video, audio, etc.) from the content distribution system 110, processes the received signals (e.g., decrypting and/or decoding the signal(s)) to access a respective content stream, and outputs the content in the respective content stream to a coupled display device 104. For example, the client device 102-A outputs content to the display device 104-1, and the client device 102-B outputs content to the display device 104-2. In some implementations, the display device 104 may be a computer monitor or a television. In some implementations, the content distribution system 110 may be one or more of a cable, satellite, broadcast, and/or Internet Protocol content distribution system. In some implementations, a client device 102 and a display device 104 may be combined into a single device (e.g., a television integrating the functionality of a set top box, or a mobile device operative to process and output signals received from content distribution system 110).

In some implementations, the content stream(s) may be transmitted continuously from the content distribution system 110, with the content included in a respective stream differing based on the time of day (e.g., different television programs on a channel throughout the day).

In some implementations, one or more of the content streams may be access-restricted or protected from unauthorized access (e.g., to prevent theft of services, to condition access on satisfaction of specific criteria or conditions). The protection or access restriction measures applied to the content streams may be applied by the content distribution system 110. Measures that may be used to protect or restrict access to a content stream include, for example, encrypting a stream and requiring that the client device 102 decrypt the stream in order to access the content. In some implementations, a decryption key is provided to the client device 102 upon satisfaction of specific criteria or conditions. In some other implementations, the decryption key is provided to the client device 102 regardless of whether the conditions or criteria are satisfied, but the client device 102 is configured to not perform the decryption using the key unless the conditions or criteria are satisfied. In still other implementations, the client device 102 may provide user authentication information (e.g., a username and password combination) prior to being authorized to access the content stream 120 and/or the advertisement information 122.

In some implementations, the signals received from the content distribution system 110 include content streams corresponding to respective channels. The client device 102 tunes to a particular channel in the signals to receive the content stream corresponding to the tuned channel, and accordingly, whatever content that may be carried on the tuned channel. The client device 102 may tune to any particular channel in the signals in accordance with end user commands (e.g., an end user changes channels using a remote control) or pre-programmed instructions (e.g., an end user sets the client device 102 to tune to a channel at a particular time interval in order to record the content in that channel at that particular time interval).

An authorized secondary device 108 may be linked with a respective client device 102. For example, the client device 102-B is linked with the secondary device 108, with the linking status represented by a dotted-line box 109, and the client device 102-A is not linked with a secondary device. The secondary device 108 is a device that is distinct from the client device 102 and has a display (either integrated with or otherwise coupled to the secondary device 108) distinct from the display device 104. In some implementations, the secondary device 108 may be referred to as a second-screen device. In some implementations, the secondary device 108 may be a desktop computer, a laptop computer, a smartphone, a tablet computer or device, a portable media player device, or a portable video game player device. A secondary device 108 may be linked with a client device 102 directly (e.g., by a wired (e.g., Universal Serial Bus (USB)) or wireless (e.g., Bluetooth, ad hoc Wi-Fi, Wi-Fi tethering) connection to the client device 102) or indirectly (e.g., the secondary device 108 and the client device 102 communicate with each other through an intermediary, such as a computer system 112).

As used in this specification, an authorized secondary device 108 is linked with a client device 102 (and vice versa) when the secondary device 108 and the client device 102 each acknowledges the presence and activity of the other device, and the secondary device 108 is authorized to display advertising content. The client device 102 and the secondary device 108 may acknowledge each other by user of a handshake or other negotiation process. Depending on the implementation, the handshake or negotiation process may be performed through a direct (wired or wireless) connection or though an intermediary (e.g., a computer system 112). When the secondary device 108 and the client device 102 are linked through an intermediary, the intermediary may be said to link one device with the other device.

In implementations where the handshake process is performed through an intermediary (e.g., the computer system 112), the handshake process may proceed as follows: an end user logs into the computer system 112, from the secondary device 108, on an account with which the client device 102 is associated. The computer system 112 detects the secondary device 108 and sends signals to the client device 102 informing the client device 102 of the presence of the secondary device 108. The client device 102 sends acknowledgement signals to the computer system 112, which relays the acknowledgement signals to the secondary device 108. The secondary device 108 sends acknowledgement signals to the computer systems 112, which relays them to the client device 102. With the client device 102 and the secondary device 108 acknowledging each other's presence, the devices are linked. The client device 102 and the secondary device 108 may periodically send signals to each other, through computer system 112, to verify that the other device is still present and active. In some implementations, activity and/or proximity of the secondary device 108 may be verified periodically or in response to predefined events. Example methods of verification of activity/proximity of the secondary device 108 include periodic log-ins on the secondary device 108, log-ins when the client device 102 or the display device 104 is powered on, detecting activation of remote-control functions to control the client device 102, motion sensors, spatially-limited communications (e.g., Bluetooth, infrared), and audio finger printing (e.g., using a microphone, if any, on the secondary device 108, to pick up surrounding sounds and verifying that the picked-up sounds includes audio from content output by the client device 102 (e.g., audio from a television program).

In some implementations, the process of linking a secondary device 108 with a client device 102 and authorizing the secondary device 108 includes a user of the secondary device 108 logging in with credentials (e.g., username and password) at the secondary device 108. The credentials that authorize the secondary device 108 are credentials associated with the content subscriber with which the client device 102 is associated. For example, a cable subscriber may log in at the secondary device 108 with credentials that are associated with their cable subscription. If the secondary device 108 is linking directly with the client device 102, the client device 102 verifies submitted credentials with the content distribution system 110 (e.g., by verifying the credentials against subscriber data 626 (FIG. 6)). If the secondary device 108 is linking with the client device 102 through computer system 112, the computer system verifies submitted credentials with the content distribution system 110.

A content distribution system 110 distributes content (e.g., television programming) to client devices 102 through the network(s) 118. In some implementations, the network(s) 118 may include one or more of fiber optic cable networks, coaxial cable networks, satellite networks, copper-wire based networks (e.g., digital subscriber line (DSL), phone line, WAN, LAN, the Internet, etc.), wireless networks (e.g., Wi-Fi, broadcast), or any mix or combination of the above. In some implementations, the content distribution system 110 may be a cable television system, satellite television system, broadcast television system, a system that delivers television programming through fiber optic networks, an Internet Protocol television (IPTV) system, an online video streaming system, a system for downloading portions or an entire media item, or any other type of content distribution system. In some implementations, the content distribution system 110 includes one or more computing devices (e.g., servers).

In some implementations, client devices 102 may be coupled to the networks 118 using multiple connections. For example, a client device 102 may connect to the networks 118 using a satellite connection and an Ethernet connection. The satellite connection may be used to receive content signals from the content distribution system 110, and the Ethernet connection may be used to transmit and receive other data (e.g., diagnostic information, billing information, etc.) to/from content distribution system 110 and/or computer system 112.

One or more computer systems 112 are communicatively coupled to the client devices 102, the secondary device 108, and the content distribution system 110. A computer system 112 includes one or more computing devices (e.g., server computers).

In some implementations, a computer system 112 is configured to be an intermediary for linking client devices 102 with secondary devices 108. The computer system 112 may include a database or other stored data that includes user accounts and information associating the user accounts with respective client devices 102. Alternatively, the information regarding user accounts and associated client devices 102 may be stored at the content distribution system 110 and the computer system 112 retrieves such information from the content distribution system 110.

In some implementations, a computer system 112 may distribute advertisements to secondary devices 108. In some implementations, the computer system 112 may determine which advertisements to distribute to a secondary device 108 based on predefined criteria (e.g., the demographics of the user of the secondary device 108, the content being output by the client device 102 to which the secondary device 108 is linked, metadata associated with the content, etc.).

In some implementations, the computer systems 112 include a respective system configured to be an intermediary for linking client devices 102 with secondary devices 108, as described above, and a respective system configured to distribute advertisements to secondary devices 108, as described above.

FIGS. 2A-2B are block diagrams illustrating distribution of content from a content distribution system 110 to a client device 102, according to some implementations. For brevity, in FIGS. 2A-2B the network(s) 118 communicatively coupling the content distribution system 110 and the client device 102 are omitted.

The content distribution system 110 distributes content to one or more client devices 102 (through network(s) 118). The content (e.g., a television program) is included in a first content stream 202 and a second content stream 204. The first stream 202 includes the content and one or more advertisements. In some implementations, the advertisements include interstitial advertisements. For example, the first stream 202 may include one or more television programs, including the commercial breaks between segments of the television program(s), and the advertisements (e.g., the commercials) that are placed in or inserted into the commercial breaks.

The second stream 204 includes the same content as that was included in the first stream 202 but not the advertisements that were included in the first stream 202 (e.g., no advertisements, or a different set of advertisements than that which was included in the first stream 202). Thus, for example, the second stream 204 may include the television program from the example described above, without commercial breaks (i.e., the segments of the television program are run together), and accordingly, without the advertisements that were placed in the commercial breaks. As another example, the second stream 204 may include a different set of advertisements than the first stream 202. The different set of advertisements may be a subset of the advertisements included in the first stream 202, or targeted advertisements that were specifically selected or opted into.

The client device 102 outputs the content included in either the first stream 202 or the second stream 204 to a display device 104 for display. By default, the client device 102 outputs a first content output 206 to the display device 104, as shown in FIG. 2A. The content output 206 includes the content and the advertisements that were included in the first content stream 202. In other words, the client device 102 processes the first stream 202 and outputs whatever is carried in the first stream 202, namely the content and the advertisements.

If one or more specific conditions or criteria are satisfied (e.g., an authorized secondary device 108 being linked with the client device 102), the client device 102 instead outputs a second content output 208 to the display device 104. The second content output 208 includes the content that was included in the second content stream 204, i.e., the same content as that which was included in the first content stream 202, but not the advertisements (or a different set of advertisements than) that were included in the first content stream 202. In other words, the client device 102 processes the second stream 204 instead of the first stream 202 and outputs whatever content is carried in the second stream 204, namely the content but not the advertisements (or a different set of advertisements).

In some implementations, the condition or criterion for outputting the second content output 208 (i.e., processing the second stream 204) is the presence of a link 109 between the client device 102 and an authorized secondary device 108, in which case the authorized secondary device 108 may be referred to as "logged into" the client device 102. The link may be a direct link, such as through direct (wired or wireless) communication between the client device 102 and the secondary device 108), or an indirect link through an intermediary, such as the computer system 112), as shown in FIG. 2B.

In some implementations, the second stream 204 may be access-restricted or otherwise protected, so that the content from the second stream 204 may not be output unless the condition(s) or criterion or criteria (e.g., a requirement that the secondary device 108 is logged into the client device 102) are satisfied. For example, the second stream 204 may be encrypted, and the client device 102 is enabled to decrypt the second stream 204 when the condition(s) or criterion or criteria are satisfied. For example, the client device 102 may be provided a decryption key (e.g., by the content distribution system 110) when the condition(s) or criterion or criteria are satisfied.

In some implementations, when the client device 102 is linked with the authorized secondary device 108 (and the client device 102 outputs the second content output 208), one or more advertisements may be displayed on the secondary device 108. The advertisements displayed on the secondary device 108 may be transmitted from the computer system 112 or the content distribution system 110, directly to the secondary device 108 or through the client device 102. In some implementations, the secondary device 108 can display advertisements extracted from first stream 202. In this manner, advertisements associated with the content of the first stream 202, provided without advertisements as second stream 204, may nevertheless be provided to the user. In some implementations, the advertisements, and optionally other content, that are displayed on the authorized secondary device 108 are received in a third content stream from the content distribution system 110 or received from another content distribution or delivery system (e.g., an advertising network) through network(s) 118. The third content stream may be transmitted to the secondary device 108. Alternatively, the third content stream may be transmitted to the client device 102, and from the client device 102 the advertisements and other content are sent to the secondary device 108. The third content stream may include some or all of the same advertisements as that which were included in the first stream 202.

In some implementations, the advertisements displayed on the secondary device 108 include one or more advertisements that are determined to be related to and/or contextual with respect to the content included in the second stream 204 and/or the end user. The determination of which advertisements are related may be made by the computer system 112 or the client device 102. The determination may be made based on metadata associated with the content or characteristics of the end user (e.g., subscriber) associated with the client device 102. For example, the advertisements may be selected because their intended demographic targets match the user's demographics or their subject matter is related to the content. It should be appreciated that the collection of data (e.g., metadata) to determine the characteristics of the end user may be subject to opt-in by the end user. Further, the collected data for a particular user may be anonymized so that the particular user is not identifiable from the collected data.

In some implementations, when the secondary device 108 is logged into the client device 102, the secondary device 108 is configured to be a remote control for the client device 102. Thus, for example, when the secondary device 108 is linked with the client device 102, an end user may input commands (e.g., change channels, activate digital recording capabilities, etc.) to the client device using the secondary device 108.

In some implementations, the content distribution system 110 sends the first stream 202 to the client device 102 if the client device 102 is not linked with an authorized secondary device 108, and sends the second stream 204 to the client device 102 when the client device 102 is linked with an authorized secondary device 108. In some other implementations, the content distribution system 110 sends both the first stream 202 and the second stream 204 to the client device 102 regardless of the linking status; the linking status determines which stream 202 or 204 is processed by the client system 102.

Figure 3:
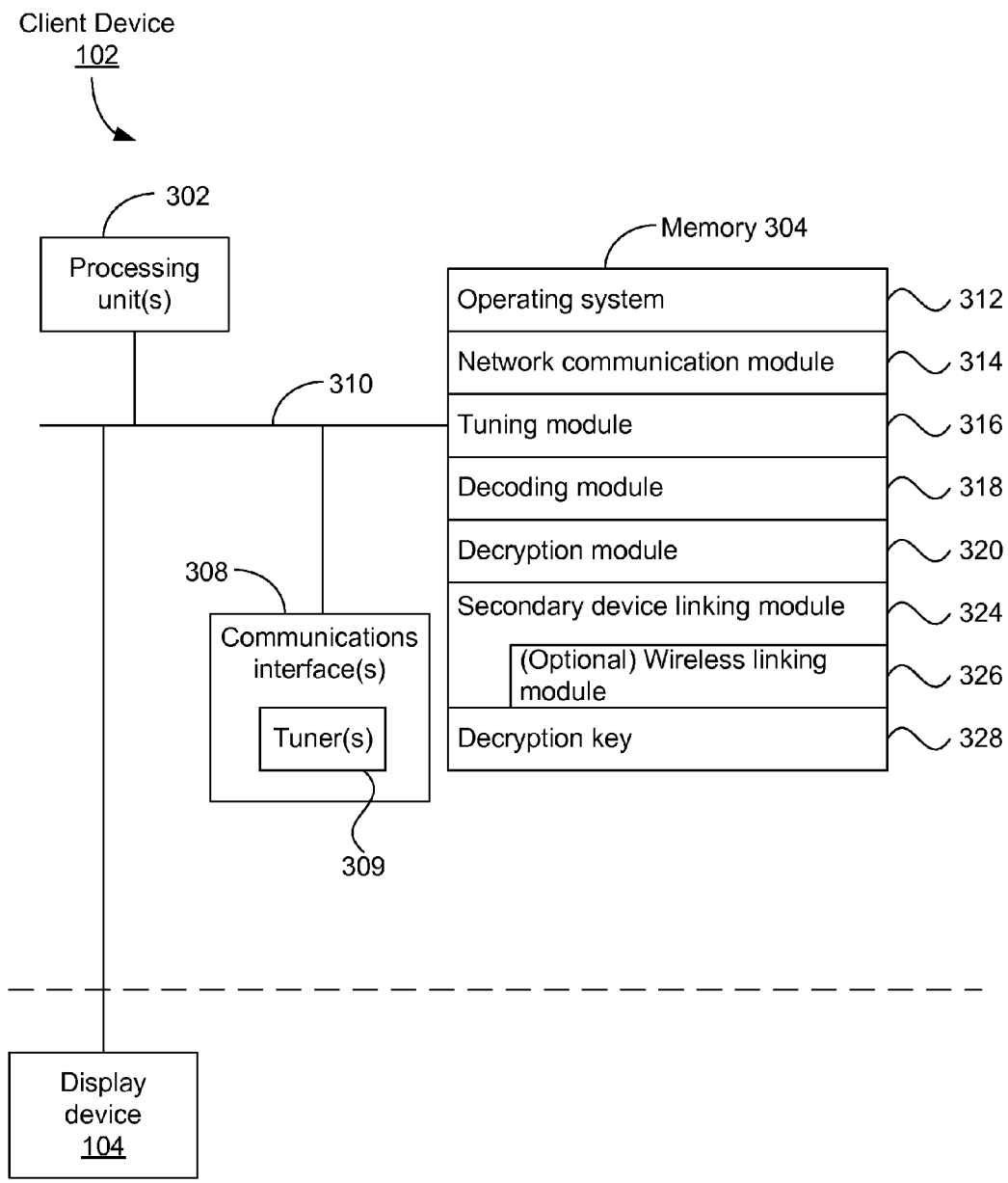
FIG. 3 is a block diagram illustrating a client device, according to some implementations.

FIG. 3 is block diagram illustrating a client device, according to some implementations. In FIG. 3, a client device 102 typically includes one or more processing units (CPU's) 302, one or more network or other communications interfaces 308, memory 304, and one or more communication buses 310 for interconnecting these components. In some implementations, the communications interfaces 308 includes one or more tuners 309 for tuning to channels in content signals transmitted from content distribution system 110. Client device 102 is coupled to a display device 104.

Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the processing unit(s) 302. Memory 304, or alternately the non-volatile memory device(s) within memory 304, comprises a non-transitory computer readable storage medium. In some implementations, memory 304 or the computer readable storage medium of memory 304 stores the following programs, modules and data structures, or a subset thereof:

- an operating system 312 that includes procedures for handling various basic system services and for performing hardware dependent tasks;
- a network communication module 314 that is used for connecting the client device 102 to other computers or systems (e.g., content distribution system 110, computer system 112) via the one or more communication network interfaces 308 (wired or wireless) and one or more communication networks, such as the Internet, other wide area networks, local area networks, metropolitan area networks, cable televisions systems, satellite television systems, IPTV systems, and so on;
- a tuning module 316 for tuning to channels in signals received from the content distribution system 110;
- a content decoding module 318 for decoding content signals received from the content distribution system 110 and outputting the content in the decoded signals to the display device 104;
- a decryption module 320 for decrypting encrypted content streams;
- a secondary device linking module 324 for linking a secondary device (e.g., secondary device 108, FIG. 5) with the client device 102; and
- one or more decryption keys 328, which may be used by the decryption module 320 to decrypt encrypted content streams.

The secondary device linking module 324 may optionally include a wireless linking module 326 for linking with a secondary device 108 through a direct wireless connection.

Figure 4:
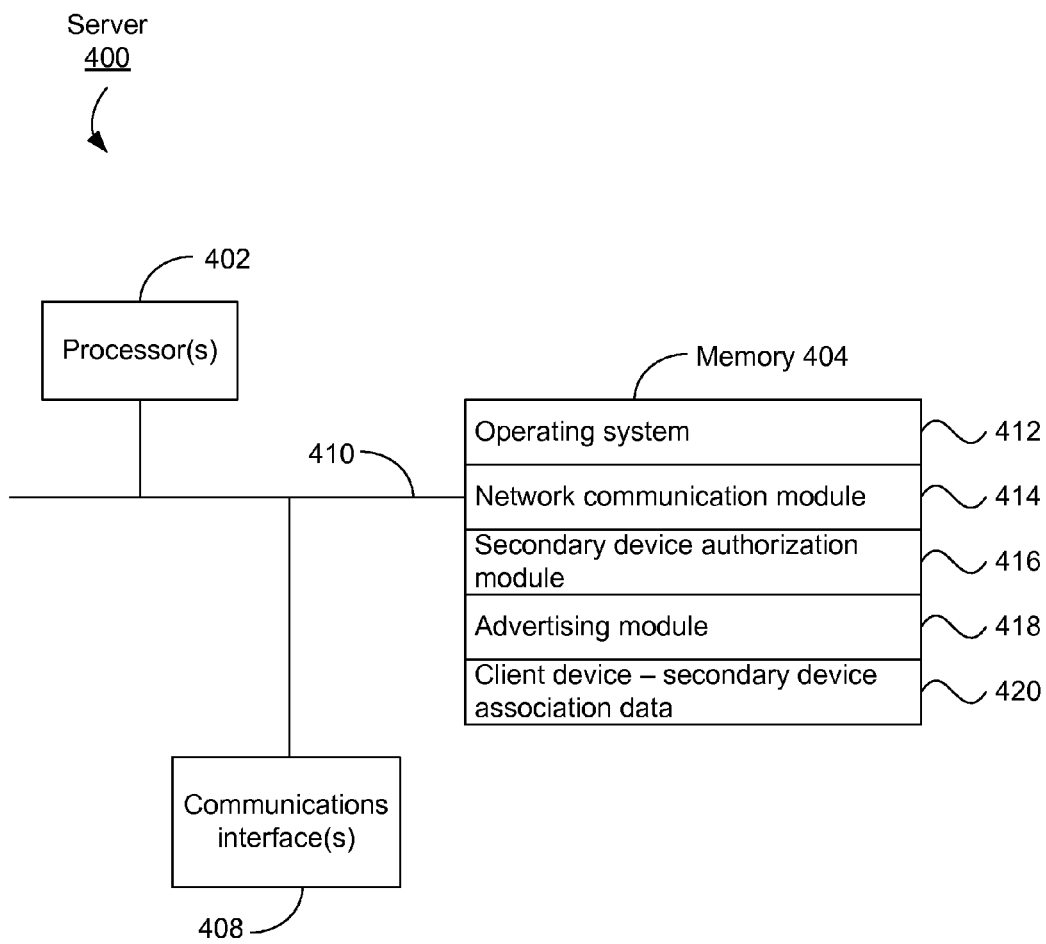
FIG. 4 is a block diagram illustrating a server in a computer system, according to some implementations.

FIG. 4 is a block diagram illustrating a computing device (e.g., a server) in a computer system 112, according to some implementations. The server 400 typically includes one or more processing units (CPU's) 402, one or more network or other communications interfaces 408, memory 404, and one or more communication buses 410 for interconnecting these components.

Memory 404 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 404 may optionally include one or more storage devices remotely located from the CPU(s) 402. Memory 404, or alternately the non-volatile memory device(s) within memory 404, comprises a non-transitory computer readable storage medium. In some implementations, memory 404 or the computer readable storage medium of memory 404 stores the following programs, modules and data structures, or a subset thereof:

- an operating system 412 that includes procedures for handling various basic system services and for performing hardware dependent tasks;
- a network communication module 414 that is used for connecting the server 400 to other computers or systems (e.g., content distribution system 110; client devices 102, secondary devices 108) via the one or more communication network interfaces 408 (wired or wireless) and one or more communication networks, such as the Internet, other wide area networks, local area networks, metropolitan area networks, cable televisions systems, satellite television systems, IPTV systems, and so on;
- a secondary device authorization module 416 for authenticating and authorizing secondary devices 108 logging onto the computer system 112;
- an advertising module 418 for determining related advertisements and providing advertisements to secondary devices 108; and
- client device—secondary device association data 420 that maps client devices to secondary devices for linking purposes.

Figure 5:
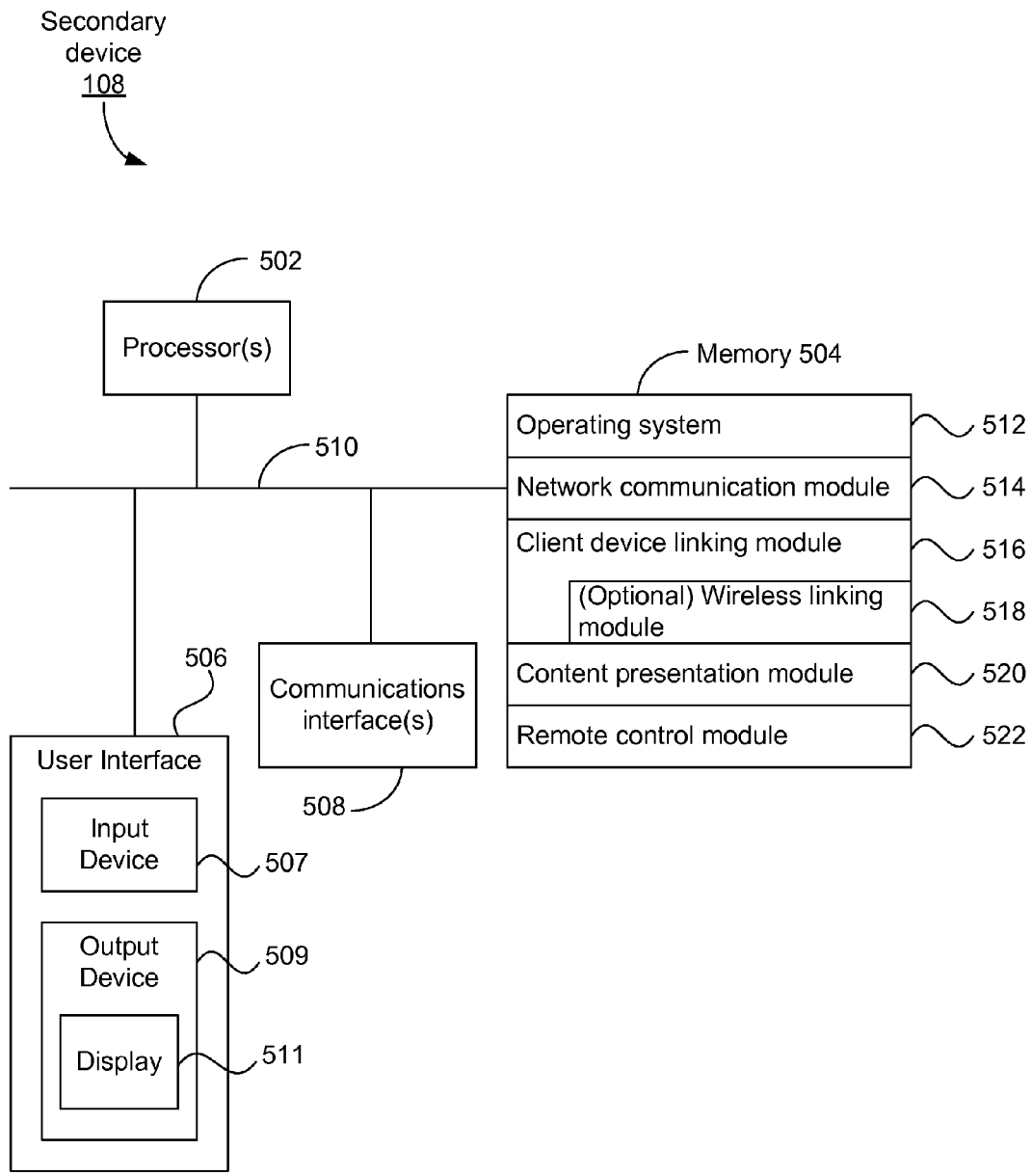
FIG. 5 is a block diagram illustrating a secondary device, according to some implementations.

FIG. 5 is block diagram illustrating a secondary device, according to some implementations. In FIG. 5, a secondary device 108 typically includes one or more processing units (CPU's) 502, one or more network or other communications interfaces 508, memory 504, and one or more communication buses 510 for interconnecting these components. The secondary device 108 also includes user interface devices 506. User interface devices 506 includes one or more input devices 507 (e.g., keyboard, mouse, touch-sensitive surface, physical buttons, etc.) and one or more output devices 509. The output devices 509 include a display device 511 and optionally other output devices (e.g., audio speakers, headphones). In some implementations, the secondary device 108 includes touch-sensitive display (also called a touch screen), which includes a touch-sensitive surface and a display device.

Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the processing unit(s) 502. Memory 504, or alternately the non-volatile memory device(s) within memory 504, comprises a non-transitory computer readable storage medium. In some implementations, memory 504 or the computer readable storage medium of memory 504 stores the following programs, modules and data structures, or a subset thereof:

- an operating system 512 that includes procedures for handling various basic system services and for performing hardware dependent tasks;
- a network communication module 514 that is used for connecting the secondary device 108 to other computers or systems (e.g., content distribution system 110, computer system 112) via the one or more communication network interfaces 508 (wired or wireless) and one or more communication networks, such as the Internet, other wide area networks, local area networks, metropolitan area networks, cable televisions systems, satellite television systems, IPTV systems, and so on;
- a client device linking module 516 for linking a client device (e.g., client device 102, FIG. 3) with the secondary device 108;
- a content presentation module 520 for presenting content on output devices 509; and
- a remote control module 522 for controlling a linked client device 102 in accordance with user inputs.

The client device linking module 516 may optionally include a wireless linking module 518 for linking with a client device 102 through a direct wireless connection.

In some implementations, the content presentation module 520 is a web browser application, a media (e.g., video) player application, or a combination thereof. The content presented by the content presentation module 520 may include advertisements.

Figure 6:
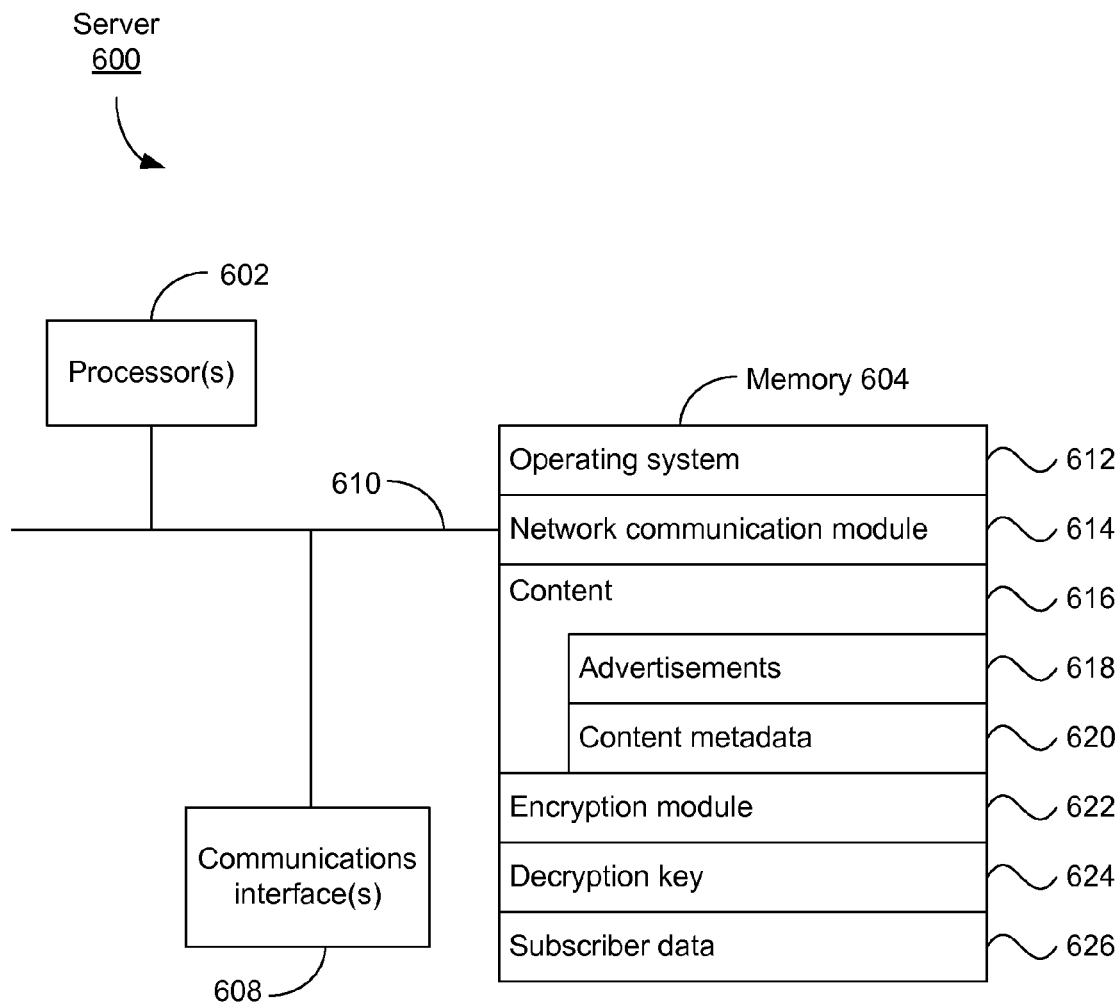
FIG. 6 is a block diagram of a server in a content distribution system, according to some implementations.

FIG. 6 is a block diagram illustrating a computing device (e.g., a server) in a content distribution system 110, according to some implementations. The server 600 typically includes one or more processing units (CPU's) 602, one or more network or other communications interfaces 608, memory 604, and one or more communication buses 610 for interconnecting these components.

Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately the non-volatile memory device(s) within memory 604, comprises a non-transitory computer readable storage medium. In some implementations, memory 604 or the computer readable storage medium of memory 604 stores the following programs, modules and data structures, or a subset thereof:

- an operating system 612 that includes procedures for handling various basic system services and for performing hardware dependent tasks;
- a network communication module 614 that is used for connecting the server 600 to other computers or systems (e.g., content distribution system 110; client devices 102, secondary devices 108) via the one or more communication network interfaces 608 (wired or wireless) and one or more communication networks, such as the Internet, other wide area networks, local area networks, metropolitan area networks, cable televisions systems, satellite television systems, IPTV systems, and so on;
- content 616 (e.g., television programming) that may be distributed to client devices 102;
- an encryption module 622 for encrypting streams containing content 616 prior to distribution to client devices 102;
- a decryption key 624 that may be sent to a client device 102 and used by the client device 102 to decrypt an encrypted stream, and
- subscriber data 626, which includes subscriber account information (e.g., usernames and passwords, devices associated with a subscriber, current subscription plans and corresponding content authorization levels, etc.).

Content 616 may include advertisements 618. The advertisements 618 may include interstitial advertisements that are inserted between portions of the content (e.g., between segments of a television program).

Content 616 may also be accompanied by content metadata 620. Content metadata 620 includes information on the content, such as program name, the channel on which the program is included, and so on. The content metadata may be used by computer system 112 (e.g., advertising module 418, FIG. 4) to determine advertisements that are related to the content.

FIGS. 3-6 are intended more as functional descriptions of the various features which may be present in a set of devices or computer systems than as a structural schematic of the implementations described herein. In practice, and as recognized by those of ordinary skill in the art, items shown separately could be combined and some items could be separated. For example, some items shown separately in these figures could be implemented on single servers and single items could be implemented by one or more servers. Some items or components shown may be omitted, and items or components that are not shown may be added. The actual number of systems used to implement determination of viewership metrics and how features are allocated among them will vary from one implementation to another.

Figure 7A:
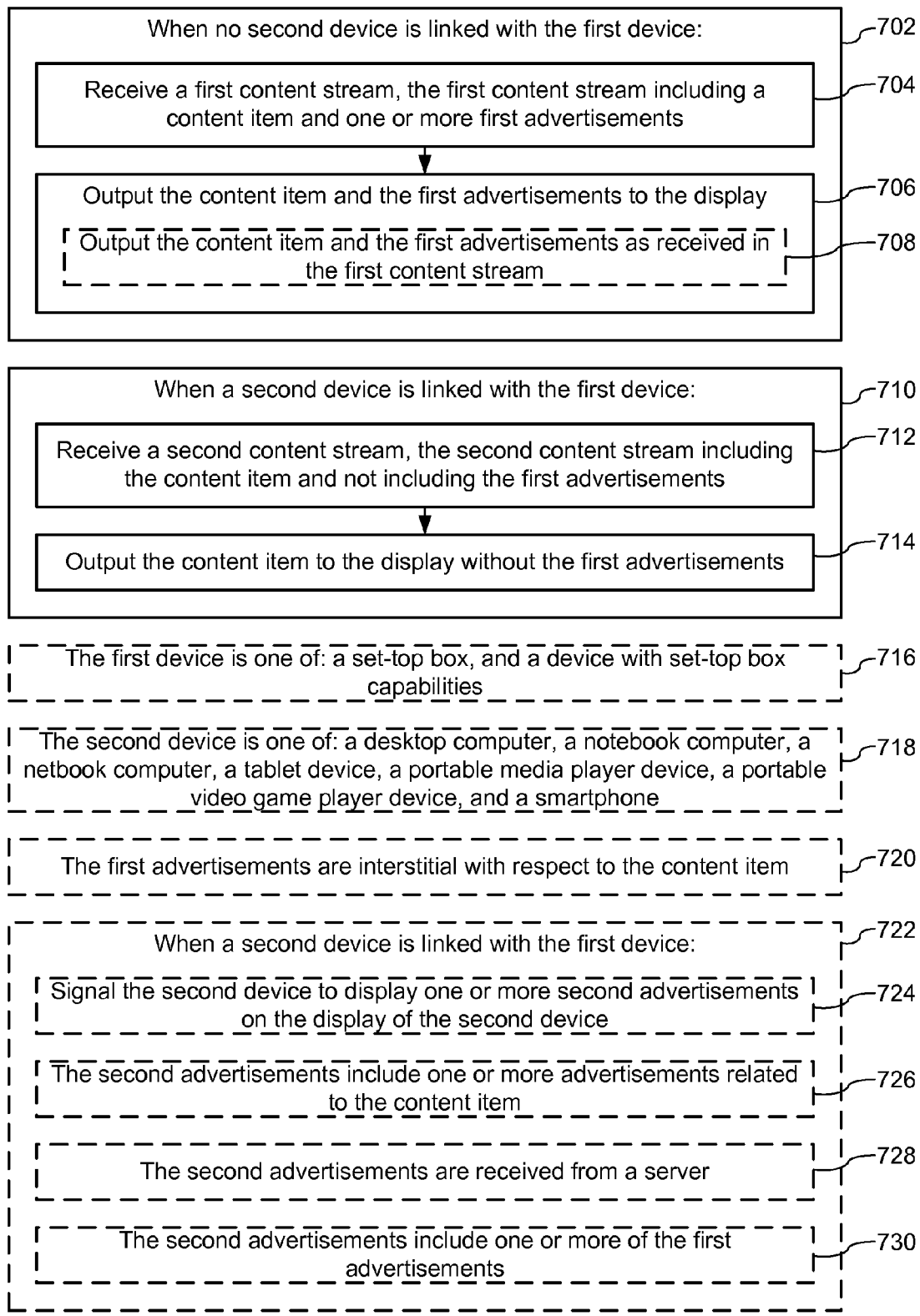
FIGS. 7A-7B are flow diagrams illustrating a process for distributing content according to some implementations.
Figure 7B:
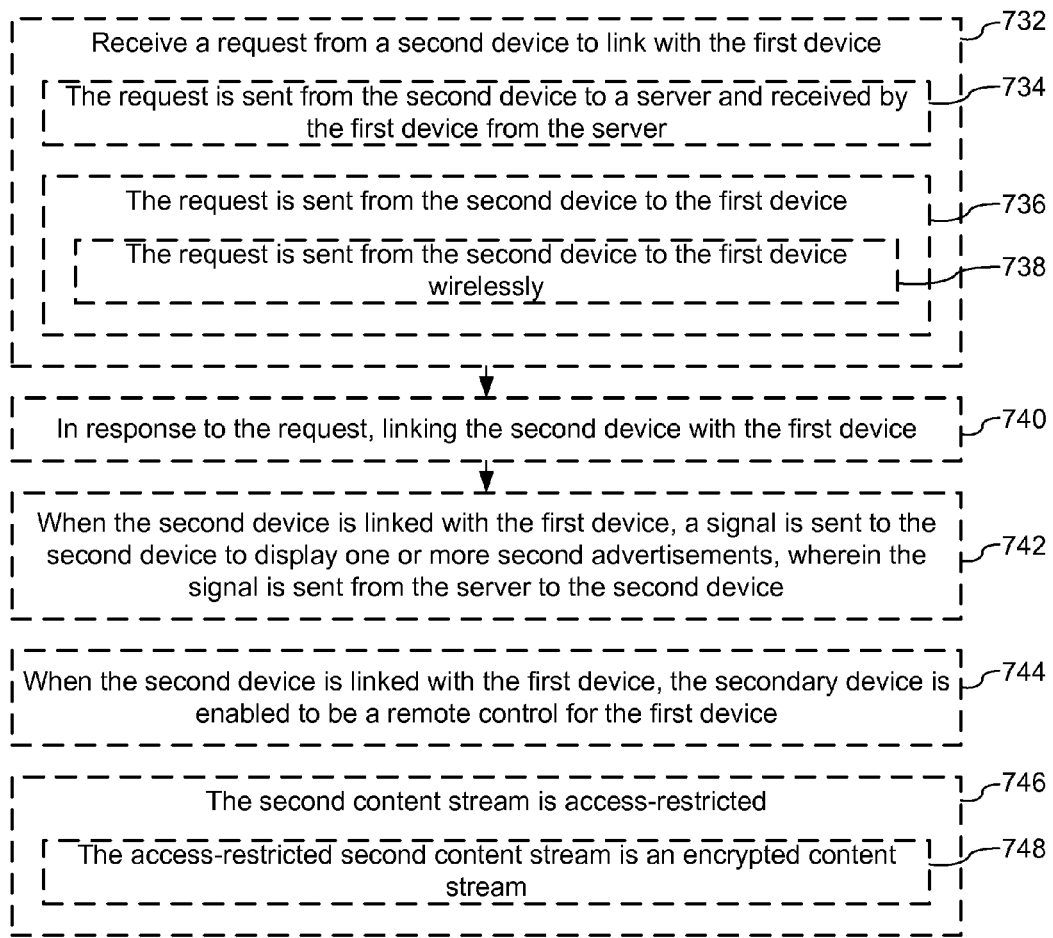

FIGS. 7A-7B are flow diagrams illustrating a process 700 for distributing content, according to some implementations. Each of the operations shown in FIGS. 7A-7B may correspond to instructions stored in a computer memory or computer readable storage medium. In some implementations, process 700 may be implemented at a client device 102 coupled to a display 104.

When no second device is linked with the first device (702), the first device receives (704) a first content stream, the first content stream including a content item and one or more first advertisements; and outputs (706) the content item and the first advertisements to the display. For example, client device 102 may receive a first content stream 202 when the client device 102 is not linked with a secondary device 108 (FIGS. 1 and 2A). The first content stream includes a content item (e.g., a television program) and one or more first advertisements. The client device 102 outputs the content item and the advertisements (e.g., as output 206, FIG. 2A) to a display (e.g., display device 104).

In some implementations, outputting the content item and the first advertisements includes outputting the content item and the first advertisements as received in the first content stream (708). In such implementations, the content item and the advertisements in the content stream, as arranged by the content distribution system 110, is output by the client device 102 after the signal is decoded. In addition, the client device 102 does not re-arrange the content item or the first advertisements and does not separate the content item from the first advertisements.

When a second device is linked with the first device (710), the first device receives (712) a second content stream, the second content stream including the content item and not including the first advertisements, and outputs (714) the content item to the display without the first advertisements. When the client device 102 is linked with a secondary device 108, the client device 102 receives a second content stream (e.g., second stream 204, FIG. 2B). The second content stream includes a content item (e.g., a television program) but not the first advertisements. The client device 102 outputs the content item (e.g., as output 208, FIG. 2B) to the display (e.g., display device 104), but does not output the advertisements.

In some implementations, the first device receives both the first and second content streams regardless of whether a second device is linked with the first device, but the first device processes one or the other depending on whether the second device is linked to the first device. If the second device is not linked to the first device, the first device processes the first stream and outputs the content item and the first advertisements, as in FIG. 2A. If the second device is linked to the first device, the first device processes the second stream and outputs the content item but not the first advertisements, as in FIG. 2B.

In some implementations, the first device is one of: a set-top box, and a device with set-top box capabilities (716). As described above, the client device 102 may be a dedicated set-top box or other device with set-top box capabilities.

In some implementations, the second device is one of: a desktop computer, a notebook computer, a netbook computer, a tablet device, a portable media player device, a portable video game player device, and a smartphone (718).

In some implementations, the first advertisements are interstitial with respect to the content item (720). For example, the first advertisements may be advertisements inserted into commercial breaks between segments of the content item.

In some implementations, when a second device that includes a display (such as a smartphone, notebook computer, or tablet computer) is linked with the first device, the first device signals the second device to display one or more second advertisements on the display of the second device (724). For example, when the client device 102 is linked with the secondary device 108, the client device 102 may signal the secondary device 108 to display one or more second advertisements on display 511. The second advertisements may be provided by the computer system 112 through the client device 102.

In some implementations, the second advertisements include one or more advertisements related to the content item (726). The computer system 112 may determine one or more second advertisements that are related to the content item, based on metadata (e.g., metadata 620) associated with the content item.

In some implementations, the second advertisements are received from a server (728). The second advertisements may be received from, for example, a server 400 in the computer system 112. The second advertisements are the advertisements used as replacements for the first advertisements, which are the advertisements that are originally provided with the content item.

In some implementations, the second advertisements include one or more of the first advertisements (730). The second advertisements may include one or more of the first advertisements that were included in the first content stream but not in the second content stream. Thus, one or more of the first advertisements that are included in the first stream and would have been output with the content item on the client device 102 may instead be displayed on the secondary device 108 in order to not disrupt enjoyment of the content item.

In some implementations, the first device receives (732) a request from a second device to link with the first device, and in response to the request, links (740) the second device with the first device. The client device 102 may link with the secondary device 108 in response to a request from the secondary device 108. The request may be sent as part of a handshake or negotiation process between the client device 102 and the secondary device 108.

In some implementations, the request is sent from the second device to a server and received by the first device from the server (734). The secondary device 108 may use the computer system 112 as an intermediary to request a link with the client device 102.

In some implementations, the request is sent from the second device to the first device (736). The secondary device 108 may send a linking request to the client device 102 directly when the secondary device 108 and client device 102 are communicatively coupled (e.g., wired or wireless). In some implementations, the request is sent from the secondary device 108 to the client device 102 wirelessly (e.g., when the first and second devices are connected wirelessly) (738).

In some implementations, when the second device is linked with the first device, a signal is sent to the second device to display one or more second advertisements, wherein the signal is sent from the server to the second device (742). When the client device 102 and the secondary device 108 are linked, the secondary device 108 may be signaled to display the second advertisements by the computer system 112 (e.g., server 400).

In some implementations, when the second device is linked with the first device, the secondary device is enabled to be a remote control for the first device (744). When the client device 102 and the secondary device 108 are linked, the remote control module 522 on the secondary device 108 may be activated and the secondary device 108 is enabled to be a remote control for controlling the client device 102 in response to user inputs.

In some implementations, the second content stream is access-restricted (746). As the second content stream does not include the first advertisements, and is thus more valuable to consumers, access to the second content stream is restricted in order that the second stream may be properly monetized. In some implementations, the access-restricted second content stream is an encrypted content stream (748). The second content stream may be encrypted in order to enforce the access restriction, and decryption may be conditioned on satisfaction of specified conditions or criteria.

Figure 8:
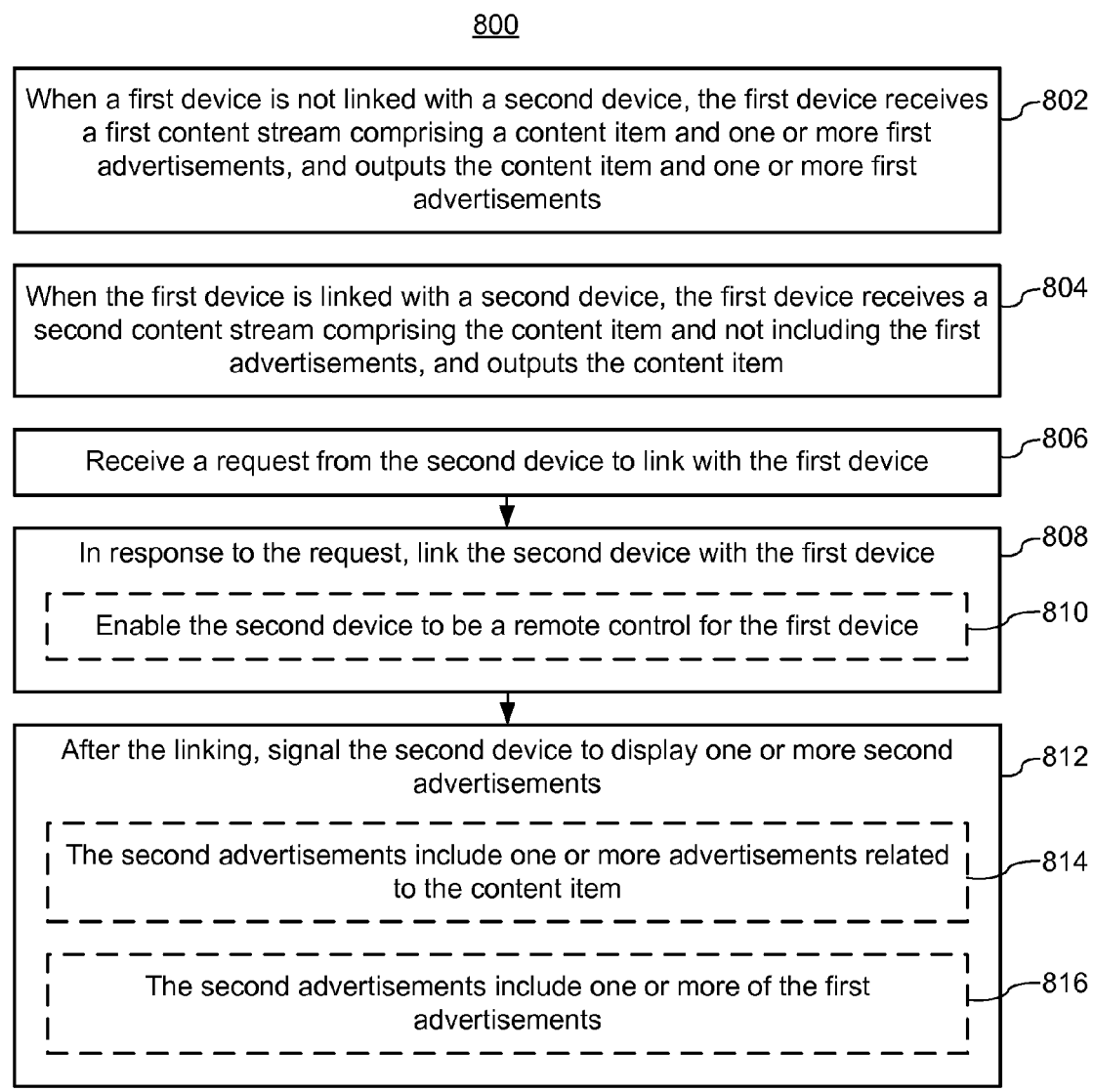
FIG. 8 is a flow diagram illustrating another process for distributing content according to some implementations.

FIG. 8 is a flow diagram illustrating a process 800 for distributing content, according to some implementations. Each of the operations shown in FIG. 8 may correspond to instructions stored in a computer memory or computer readable storage medium. In some implementations, process 800 may be implemented at a server 400 of a computer system 112. The server 400 may be communicatively coupled with a first device (e.g. client device 102) and a second device (e.g., secondary device 108).

When a first device is not linked with any second device, the first device receives a first content stream comprising a content item and one or more first advertisements, and outputs the content item and one or more first advertisements (802). When the client device 102 is not linked with a secondary device 108, the client device 102 receives a first content stream that includes the content item and the first advertisements, and outputs the content item and the first advertisements.

When the first device is linked with a second device, the first device receives a second content stream comprising the content item and not including the first advertisements, and outputs the content item (804). When the client device 102 is linked with a secondary device 108, the client device 102 receives a second content stream that includes the content item but not the first advertisements, and outputs the content item and not the first advertisements.

The server receives a request from the second device to link with the first device (806). When the first and second devices are not linked, the server 400 may receive a request from the secondary device 108 to link with the client device 102. The secondary device 108 may first be logged into the server 400, and then a linking request is sent from the second device 108 to server 400.

In response to the request, the server links the second device with the first device (808). The server 400 mediates the linking handshake or negotiation process between the secondary device 108 and the client device 102 in response to the request and links the secondary device 108 with the client device 102 when the handshake or negotiation process is successful.

After the linking, the server signals the second device to display one or more second advertisements (812). After the server 400 links the client device 102 and the secondary device 108, while the client device 102 and the secondary device 108 are linked, the server 400 signals the secondary device 108 to display one or more second advertisements. The server 400 may also provide the second advertisements to the secondary device 108 for display.

In some implementations, linking the second device with the first device includes enabling the second device to be a remote control for the first device (810). When the server 400 links the secondary device 108 with the client device 102, the server 400 may signal the secondary device 108 to activate the remote control module 522. When the remote control module 522 is enabled, the secondary device 108 can accept user inputs to control the client device 102.

In some implementations, the second advertisements include one or more advertisements related to the content item (814). The computer system 112 may determine one or more second advertisements that are related to the content item, based on metadata associated with the content item.

In some implementations, the second advertisements include one or more of the first advertisements (816). The second advertisements may include one or more of the first advertisements that were included in the first content stream but not in the second content stream. Thus, one or more of the first advertisements that are included in the first stream and would have been output with the content item on the client device 102 may instead be displayed on the secondary device 108 in order to not disrupt enjoyment of the content item.

Figure 9:
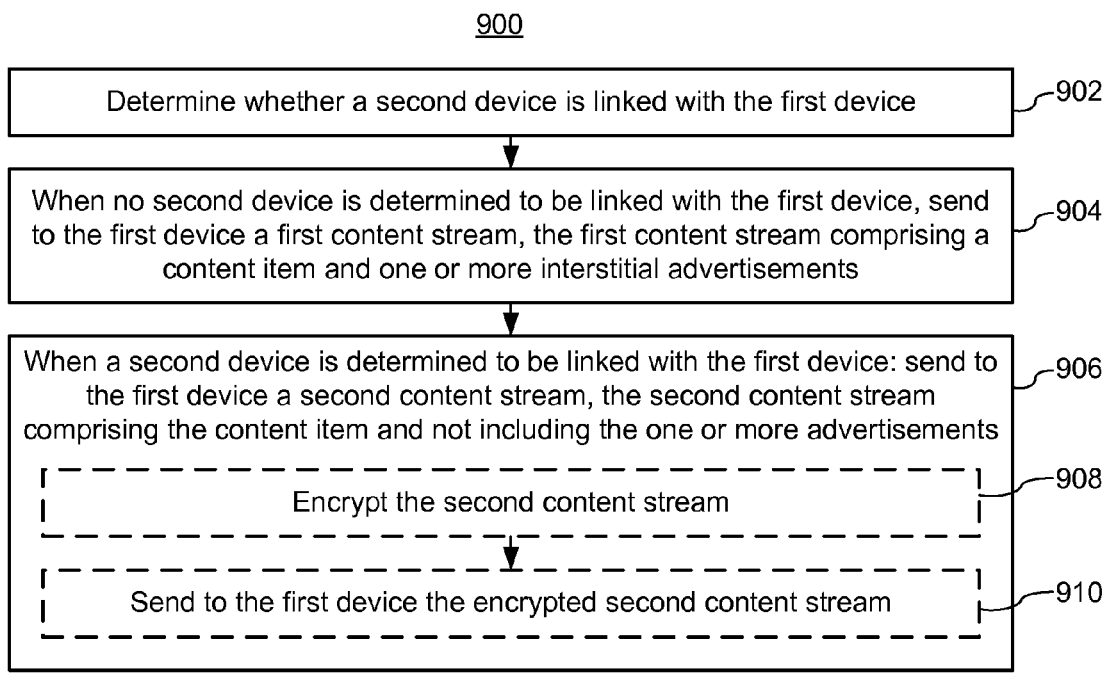
FIG. 9 is a flow diagram illustrating another process for distributing content according to some implementations.

FIG. 9 is a flow diagram illustrating a process 900 for distributing content, according to some implementations. Each of the operations shown in FIG. 9 may correspond to instructions stored in a computer memory or computer readable storage medium. In some implementations, process 900 may be implemented at a server 600 of a content distribution system 110. The server 600 may be communicatively coupled with a first device (e.g. client device 102).

The server determines whether a second device is linked with the first device (902). The server 600 determines whether a secondary device 108 is linked with the client device 102. In some implementations, the server 600 may send signals to the client device 102 inquiring the linking status of the client device 102. Alternatively, the client device 102 may periodically signal the server 600 of its linking status.

When no second device is determined to be linked with the first device, the server sends (904) to the first device a first content stream, the first content stream including a content item and one or more advertisements. When the client device 102 is not linked with a secondary device 108, the server 600 sends a first stream that includes a content item and one or more advertisements to the client device 102.

When a second device is determined to be linked with the first device, the server sends to the first device a second content stream, the second content stream including the content item without the one or more advertisements (906). When the client device 102 is linked with a secondary device 108, the server 600 sends a second stream that includes a content item, but not the one or more advertisements, to the client device 102.

In some implementations, sending the second content stream includes encrypting the second content stream (908) and sending to the first device the encrypted second content stream (910). The server 600 may encrypt the second stream and send the encrypted second stream to the client device 102, in order to restrict access to the second stream until specified conditions or criteria are satisfied.

Figure 10:
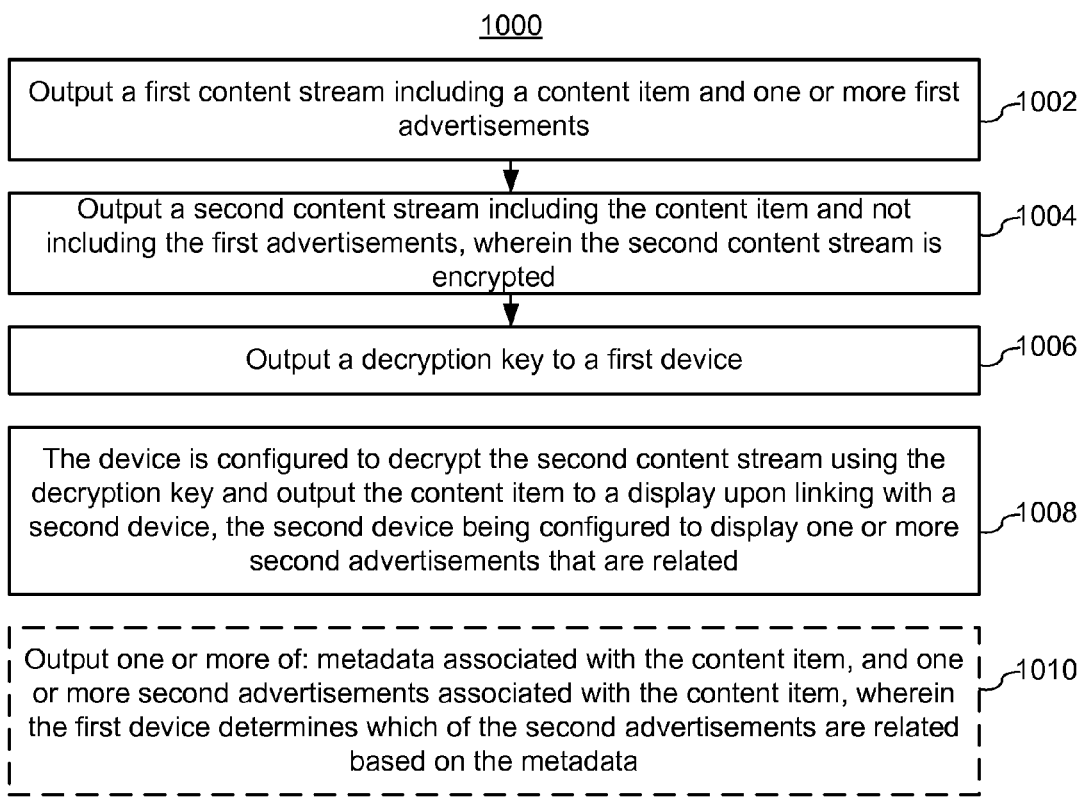
FIG. 10 is a flow diagram illustrating another process for distributing content according to some implementations.

FIG. 10 is a flow diagram illustrating a process 1000 for distributing content, according to some implementations. Each of the operations shown in FIG. 10 may correspond to instructions stored in a computer memory or computer readable storage medium. In some implementations, process 1000 may be implemented at a server 600 of a content distribution system 110.

The server outputs a first content stream including a content item and one or more first advertisements (1002), and outputs a second content stream including the content item and not including the first advertisements, wherein the second content stream is encrypted (1004). The server 600 outputs (e.g., transmits) a first content stream and a second content stream to multiple client devices 102. The first content stream includes a content item and one or more first advertisements. The second content stream includes the content item but not the first advertisements.

The server outputs a decryption key to a first device (1006), where the device is configured to decrypt the second content stream using the decryption key and output the content item to a display upon linking with a second device, the second device being configured to display one or more second advertisements that are related (108). The server 600 may send a decryption key, for decrypting the second content stream, to client devices 102. A client device 102 is configured to decrypt the second stream using the key and outputting the content item in the second stream to the display device 104 upon (or in response to) linking with a secondary device 108. The secondary device 108 is configured to receive one or more second advertisements that are related (e.g., to the content item, to the end user associated with the client device 102) and to display the second advertisements.

In some implementations, the server outputs one or more of: metadata associated with the content item, and one or more second advertisements associated with the content item, where the first device determines which of the second advertisements are related based on the metadata (1010). The server 600 also may transmit metadata 620 associated with the content item and the one or more second advertisements to the client devices 102. A client device 102 determines which of the second advertisements are related to the content item based on the metadata.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Reference has been made in detail to implementations, examples of which are illustrated in the accompanying drawings. In the above detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the implementations.

The foregoing description, for purpose of explanation, has been described with reference to specific implementations. The implementations were chosen and described in order to best explain the principles of the invention and its practical applications, to thereby enable others skilled in the art to best utilize the invention and various implementations with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method comprising:
   at a first device coupled to a first display:
   receiving a first content stream, the first content stream including a content item and one or more first advertisements;
   receiving concurrently with the first content stream a second content stream, the second content stream including the content item and not including the one or more first advertisements;
   determining by the first device or a server connected to the first device, automatically and without user intervention, whether the first device is linked with one or more second devices;
   in accordance with the determination that no second device is linked with the first device, outputting the first content stream including the content item and the one or more first advertisements to the first display; and
   in accordance with the determination that a second device is linked with the first device, outputting the second content stream including the content item to the first display without the one or more first advertisements, thereby enabling the second device to display one or more second advertisements on a second display, wherein the second device includes the second display, and wherein a signal causing the second device to display the one or more second advertisements is sent by a server connected to the second device.

2. The method of claim 1, wherein the first device is a set-top box or a device with set-top box capabilities.

3. The method of claim 1, wherein the second device is one of: a desktop computer, a notebook computer, a netbook computer, a tablet device, a portable media player device, a portable video game player device, and a smartphone.

4. The method of claim 1, wherein the first advertisements are interstitial with respect to the content item.

5. The method of claim 1, wherein outputting the content item and the first advertisements comprises outputting the content item and the first advertisements as received in the first content stream.

6. The method of claim 1, wherein it is determined that the first device is linked with a second device when the second device and the first device each acknowledges the presence and activity of the other device.

7. The method of claim 1, wherein the second advertisements include one or more advertisements related to the content item.

8. The method of claim 1, wherein the second advertisements are received from a server.

9. The method of claim 1, wherein the second advertisements include one or more of the first advertisements.

10. The method of claim 1, further comprising:
    receiving a request from the second device to link with the first device; and
    in response to the request, linking the second device with the first device.

11. The method of claim 10, wherein the request is sent from the second device to the server and received by the first device from the server.

12. The method of claim 10, wherein the request is sent from the second device to the first device.

13. The method of claim 1, wherein when the second device is linked with the first device, the second device is enabled to be a remote control for the first device.

14. The method of claim 1, wherein the second content stream is access-restricted.

15. The method of claim 14, wherein the access-restricted second content stream is an encrypted content stream.

16. A method, comprising:
    at a server in communication with a first device:

determining by the server, automatically and without user intervention, whether the first device is linked with one or more second devices;

in accordance with a determination that no second device is linked with the first device, sending to the first device a first content stream, the first content stream comprising a content item and one or more first advertisements; and in accordance with a determination that a second device is linked with the first device, sending to the first device a second content stream, the second content stream comprising the content item and not including the one or more first advertisements, and signaling the second device to display one or more second advertisements.

17. The method of claim 16, wherein sending the second content stream comprises:
   encrypting the second content stream; and
   sending to the first device the encrypted second content stream.

18. The method of claim 16, wherein the second content stream is encrypted; and further comprising:
   sending a decryption key to the first device; and
   sending the one or more second advertisements to the first device;
   wherein the first device is configured to decrypt the second content stream using the decryption key and output the content item to a display upon linking with the second device, the second device being configured to display the one or more second advertisements received from the first device that are related.

19. The method of claim 18, further comprising:
   outputting one or more of:
      metadata associated with the content item, and
      the one or more second advertisements associated with the content item,
      wherein the device determines which of the second advertisements are related based on the metadata.

20. The method of claim 16, wherein it is determined that the first device is linked with a second device when the second device and the first device each acknowledges the presence and activity of the other device.

21. A system, wherein the system includes a first device, comprising:
   one or more processing units;
   a first display device; and
   memory storing one or more programs to be executed by the one or more processing units;
   the one or more programs comprising instructions for:
      receiving a first content stream, the first content stream including a content item and one or more first advertisements;
      receiving a second content stream concurrently with the first content stream, the second content stream including the content item and not including the one or more first advertisements;
      determining by the first device or a server connected to the first device, automatically and without user intervention, whether the first device is linked with one or more second devices;
      in accordance with the determination that no second device is linked with the first device, outputting the first content stream including the content item and the one or more first advertisements to the first display; and
      in accordance with the determination that a second device is linked with the first device, outputting the second content stream including the content item to the first display without the one or more first advertisements, thereby enabling the second device to display one or more second advertisements on a second display, wherein the second device includes the second display, and wherein a signal causing the second device to display the one or more second advertisements is sent by a server connected to the second device.

22. A non-transitory computer readable storage medium storing one or more programs configured for execution by a computer coupled to a first display, wherein the computer includes a first device, the one or more programs comprising instructions for:
   receiving a first content stream, the first content stream including a content item and one or more first advertisements;
   receiving a second content stream concurrently with the first content stream, the second content stream including the content item and not including the one or more first advertisements;
   determining by the first device or a server connected to the first device, automatically and without user intervention, whether the first device is linked with one or more second devices;
   in accordance with the determination that no second device is linked with the first device, outputting the first content stream including the content item and the one or more first advertisements to the first display; and
   in accordance with the determination that a second device is linked with the first device, outputting the second content stream including the content item to the first display without the one or more first advertisements, thereby enabling the second device to display one or more second advertisements on a second display, wherein the second device includes the second display, and wherein a signal causing the second device to display the one or more second advertisements is sent by a server connected to the second device.

* * * * *